Figure 1:
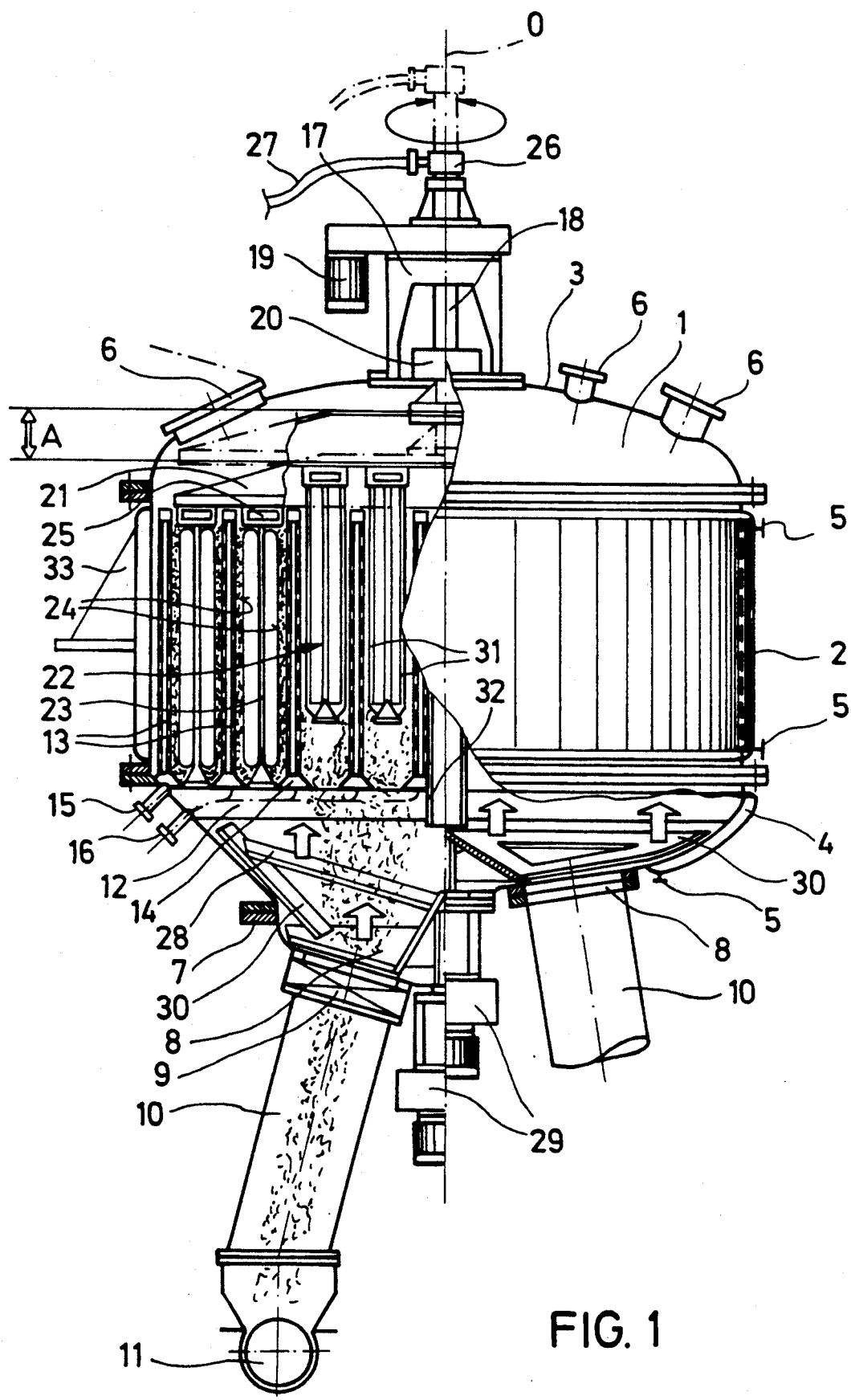

United States Patent [19]

Kupka

[11] Patent Number: 5,154,825

[45] Date of Patent: Oct. 13, 1992

[54] AUTOMATIC FILTER PRESS

[75] Inventor: Dieter Kupka, Rain, Fed. Rep. of Germany

[73] Assignee: Herco-CFF Chiral Flow Filtertechnik GmbH, Freiberg, Fed. Rep. of Germany

[21] Appl. No.: 690,952

[22] PCT Filed: Nov. 17, 1989

[86] PCT No.: PCT/EP89/01385

§ 371 Date: May 9, 1991

§ 102(e) Date: May 9, 1991

[87] PCT Pub. No.: WO90/05574

PCT Pub. Date: May 31, 1990

[30] Foreign Application Priority Data

Nov. 17, 1988 [EP] European Pat. Off. ........ 88119067.2

[51] Int. Cl.$^5$ .................... B01D 33/073; B01D 33/46; B01D 33/64

[52] U.S. Cl. .................... 210/327; 210/331; 210/334; 210/342; 210/350; 210/396; 210/414; 210/415; 100/112; 100/125; 100/211

[58] Field of Search ............ 210/224, 225, 327, 331, 210/332, 334, 342, 347, 386, 396, 397, 413–415, 487, 770, 350; 100/110, 112, 116, 125, 211; 15/256.52

[56] References Cited

U.S. PATENT DOCUMENTS

| 651,621 | 6/1890 | Black et al. ........................ 210/342 |
| 3,497,060 | 2/1970 | Tra et al. ............................ 210/414 |
| 4,366,055 | 12/1982 | Gwilliam et al. .................. 210/350 |
| 4,722,789 | 2/1988 | Kupka ................................ 210/225 |

FOREIGN PATENT DOCUMENTS

| 226659 | 1/1987 | European Pat. Off. . |
| 2558683 | 7/1977 | Fed. Rep. of Germany ...... 210/342 |
| 1033621 | 7/1953 | France . |

Primary Examiner—Mary Lynn Theisen
Assistant Examiner—Matthew O. Savage
Attorney, Agent, or Firm—Brooks, Haidt, Haffner & Delahunty

[57] ABSTRACT

Disclosed is a filter press comprising a substantially cylindrical vessel, a plurality of filter elements disposed in the vessel parallel to one another, and a rotor having a rotor shaft rotatably mounted in the vessel and a plurality of rotor elements fixedly connected to the rotor shaft and extending each between two adjacent filter elements, the surface of the rotor elements being adapted to be forced towards the filter elements for mechanically compressing filter cakes accumulated thereon, wherein the axis of the vessel is disposed in an upright position, the filter elements and rotor elements being formed as cylindrical wall members disposed in concentric relationship to one another with the rotor elements extending into the spaces between adjacent filter elements and being secured to a mounting structure connected to the rotor shaft, while the filter elements are supported on a carrier grid in the vessel. The lower ends of the rotor elements can be lowered to an advanced position in which they close the lower end of the sludge space between the respective rotor element and the associated filter element.

26 Claims, 9 Drawing Sheets

AUTOMATIC FILTER PRESS

The invention relates to a filter press of the type described in EP-A-0 226 659.

The known filter press comprises a cylindrical housing centered about a horizontal axis and containing a plurality of disc-shaped filter elements rigidly supported in parallel side-by-side relationship on a frame disposed in the housing. Disposed between the filter elements are respective disc-shaped rotor elements fixedly secured to a common rotor shaft extending through the filter elements. The rotor elements are provided with press plates adapted to be forced away from one another and into pressure contact with filter cakes accumulated on the filter elements to thereby mechanically compress the filter cakes for removing liquid therefrom. The rotor shaft is axially adjustable for permitting or at least facilitating the removal of the filter cakes from the filter elements by rotation of the rotor shaft and the rotor discs secured thereto.

A filter press of this type may be operated in such a manner that during the filtering operation the rotor composed of the rotor shaft and the rotor discs is rotated, so that in the sludge to be filtered a fluid flow is generated in a direction across the surfaces of the filter elements. This is effective to avoid premature clogging of the filter cloths attached to the filter elements. In this manner it is possible to achieve a continuous clear filtrate output by continuing the filtering operation over an extended period of time. As a result of the construction of this filter press, the transverse flow of the sludge generated by the rotor discs is necessarily of a slower speed at axially inner locations, i.e. adjacent the rotor shaft, than at peripheral locations, i.e. adjacent the cylindrical housing wall. Although these differences of the flow speed could be compensated by the provision that ribs disposed on the rotor discs are of a different shape, specifically a different height at locations adjacent the rotor shaft as compared to locations adjacent the outer rim of the rotor discs, this would result in the space within the filter press being inadequately utilized. In addition, this construction would impair the pressing function to be additionally performed by the rotor discs, because the ribs would restrict the mechanical compression stroke of the rotor disc surfaces as they are forced into contact with the filter cakes.

When in the known filter press the filter cloths have to be replaced, this operation requires the rotor shaft to be dismounted, unless the filter elements are of a construction, specifically a separable construction, permitting them to be removed from the housing without disassembly of the rotor shaft.

It is an object of the present invention to provide a filter press of the type defined in the introduction, wherein the available space within the housing is utilized more effectively, i.e. which permits the size of the filter surfaces to be increased in relation to the housing volume, which permits a uniform transverse flow of the sludge to be obtained across the filter surfaces, and which permits the filter elements, and particularly the filter cloths attached thereto, to be readily replaced.

The invention completely abandons the concept conventionally employed in the filter press technology of employing substantially disc-shaped or plate shaped filter elements, in place of which it employs cylindrical filter elements, or more specifically filter elements in the shape of cylindrical walls of different diameters in a concentrically nested arrangement. The rotor elements disposed between the filter elements are therefore formed as cylindrical wall elements secured to a common transverse mounting structure and extending downwards into the spaces between the filter elements supported on and secured to a common carrier grid. This permits the construction of the filter press to be designed in such a manner that the rotor and the filter elements can be moved apart in the axial direction to thereby make the filter elements—and also the rotor elements—readily accessible for maintenance operations.

The invention also offers the possibility of a modular construction of filter presses of different sizes by the selection of suitable diameters permitting, in the case of filter presses of a greater diameter, the filter elements and rotor elements of a filter press of smaller diameter to be employed as the inner filter and rotor elements, respectively.

A further considerable advantage of the invention resides in the fact that a transverse flow of the sludge may be created not only by the rotor elements extending between the filter elements, but in addition also by an agitator disposed in the housing upstream of an axial end of the above-named components, this agitator being additionally usable at the end of a filtering operation for discharging the filter cakes from the housing after they have been separated from the filter elements.

In order to enable the filter cakes to be thus separated and discharged, the housing axis is disposed vertically as different from the filter press from which the present invention proceeds, so that the filter cakes removed from the filter elements by the rotation of the rotor can readily drop downwards and through the openings of the carrier grid.

Although in the filter press according to the invention the circumferential speed of the rotary press is by nature likewise slower adjacent its axis than adjacent the cylindrical housing wall, i.e. the speed of the press element relative to the associated filter element is slower in the case of filter elements of smaller diameters than in the case of the filter elements of greater diameters, this speed difference can be effectively compensated without impairing the function of the filter press by varying the design of the rotor elements, particularly of radially projecting ribs formed thereon, in accordance with the variation of the radii of their circumferential paths. In this case the configuration of the respective rotor element remains constant over its full axial length, as a result of which it is possible to obtain optimum conditions with regard to utilization of the available space and the generation of the transverse fluid flow without having to accept any compromise. In addition, this construction permits the filter surface area to be considerably enlarged without any increase of space requirements.

Figure 2:
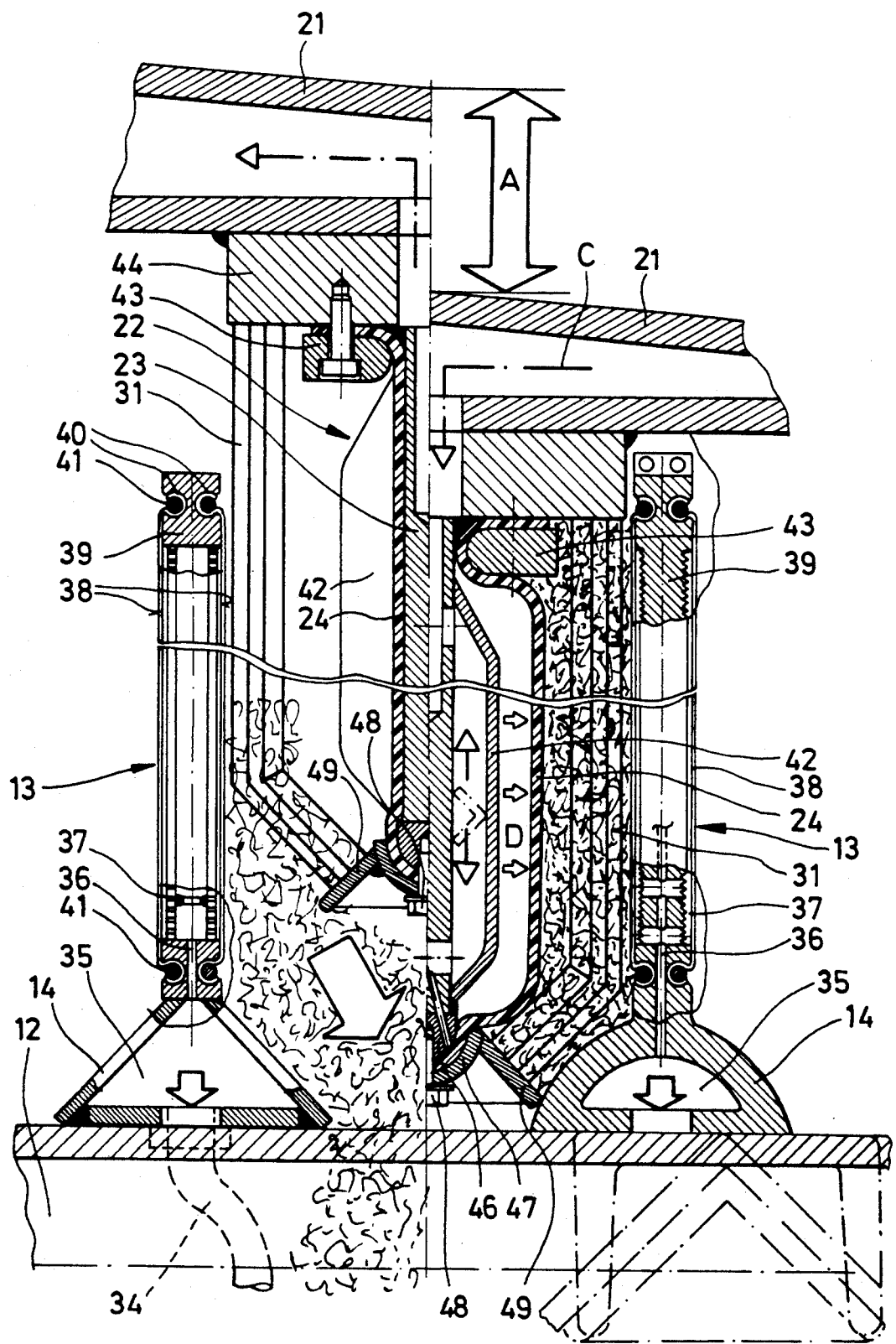
Figure 3:
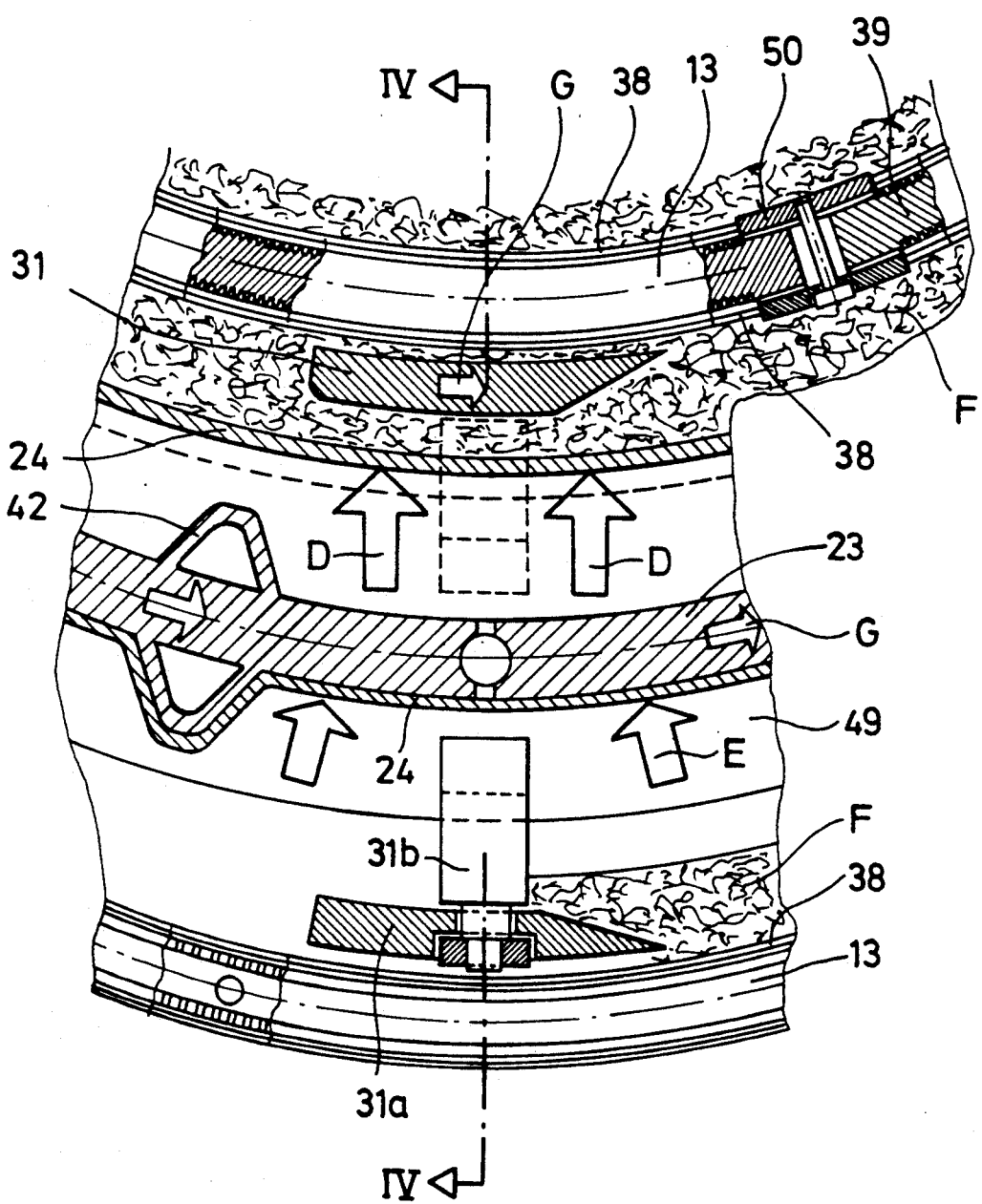
Figure 5:
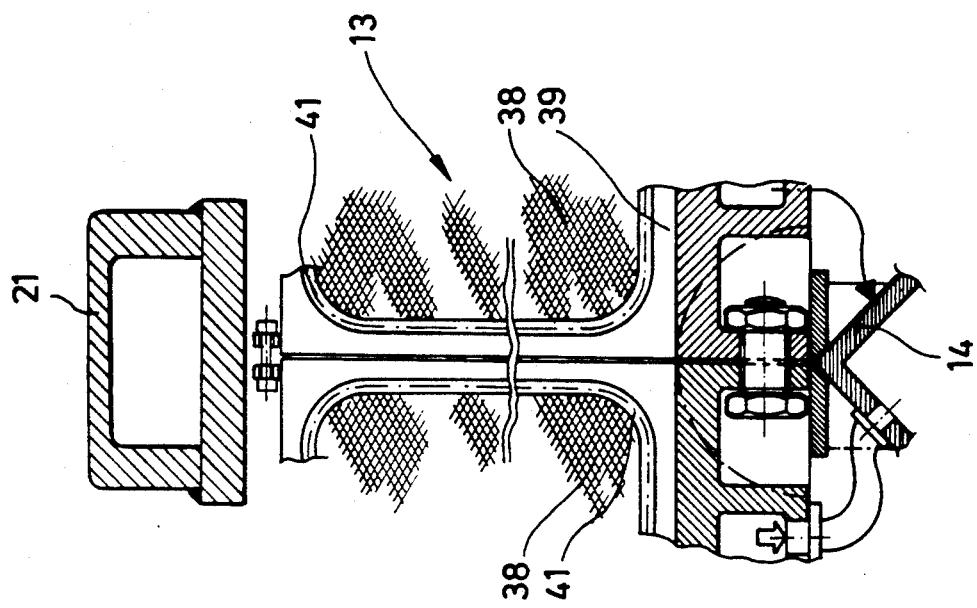
Figure 4:
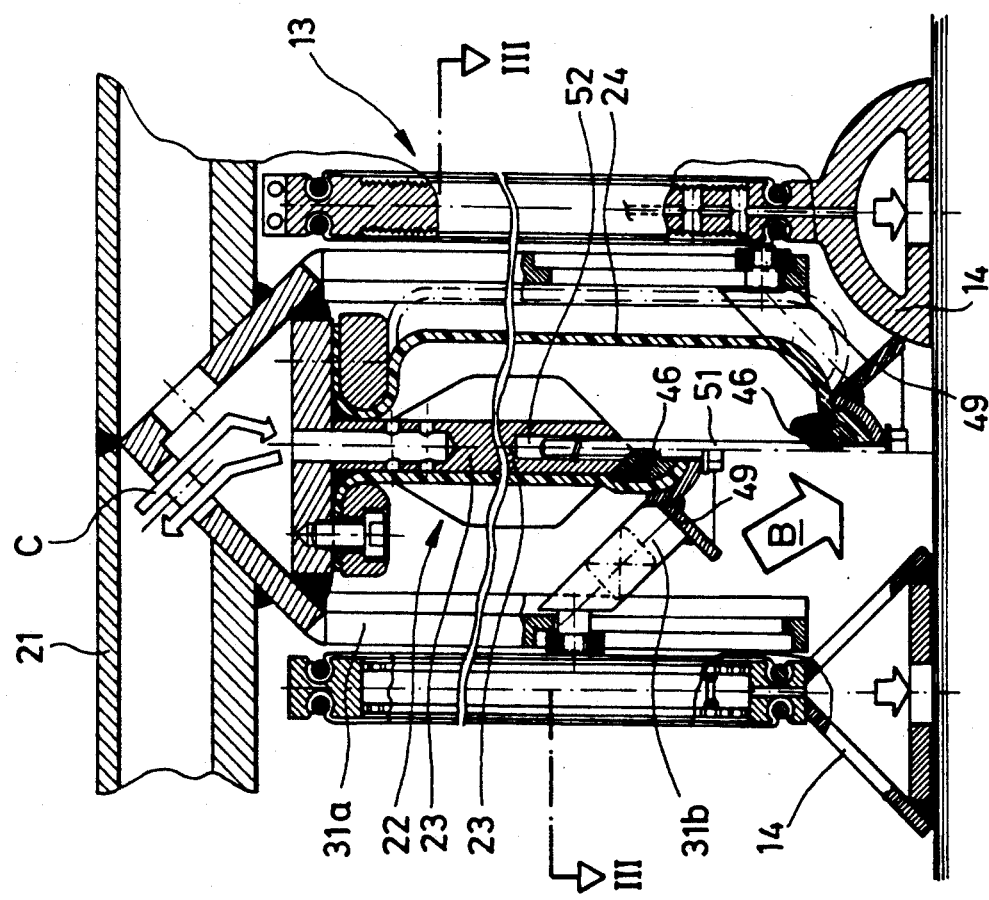
Figure 6:
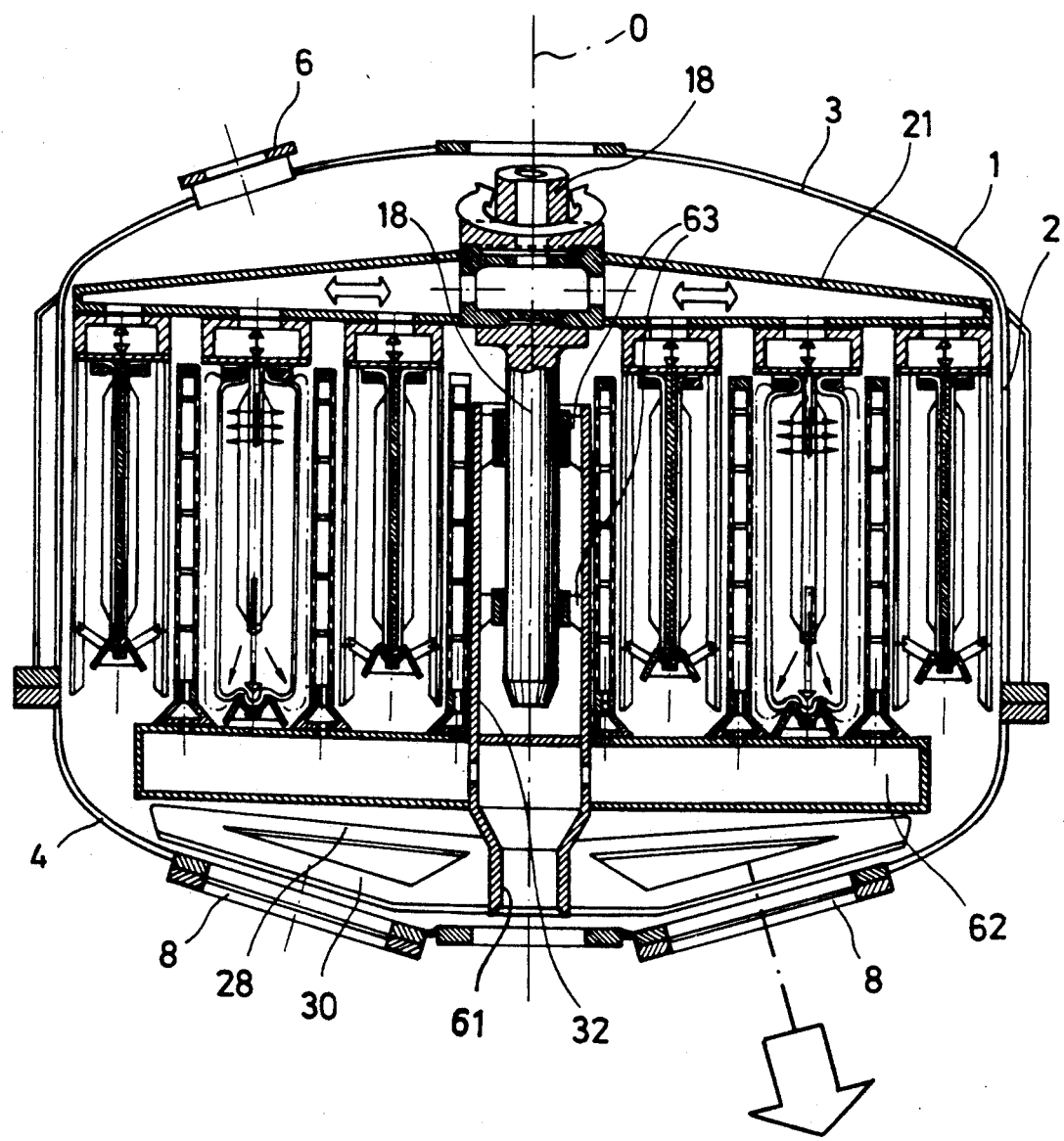
Figure 7:
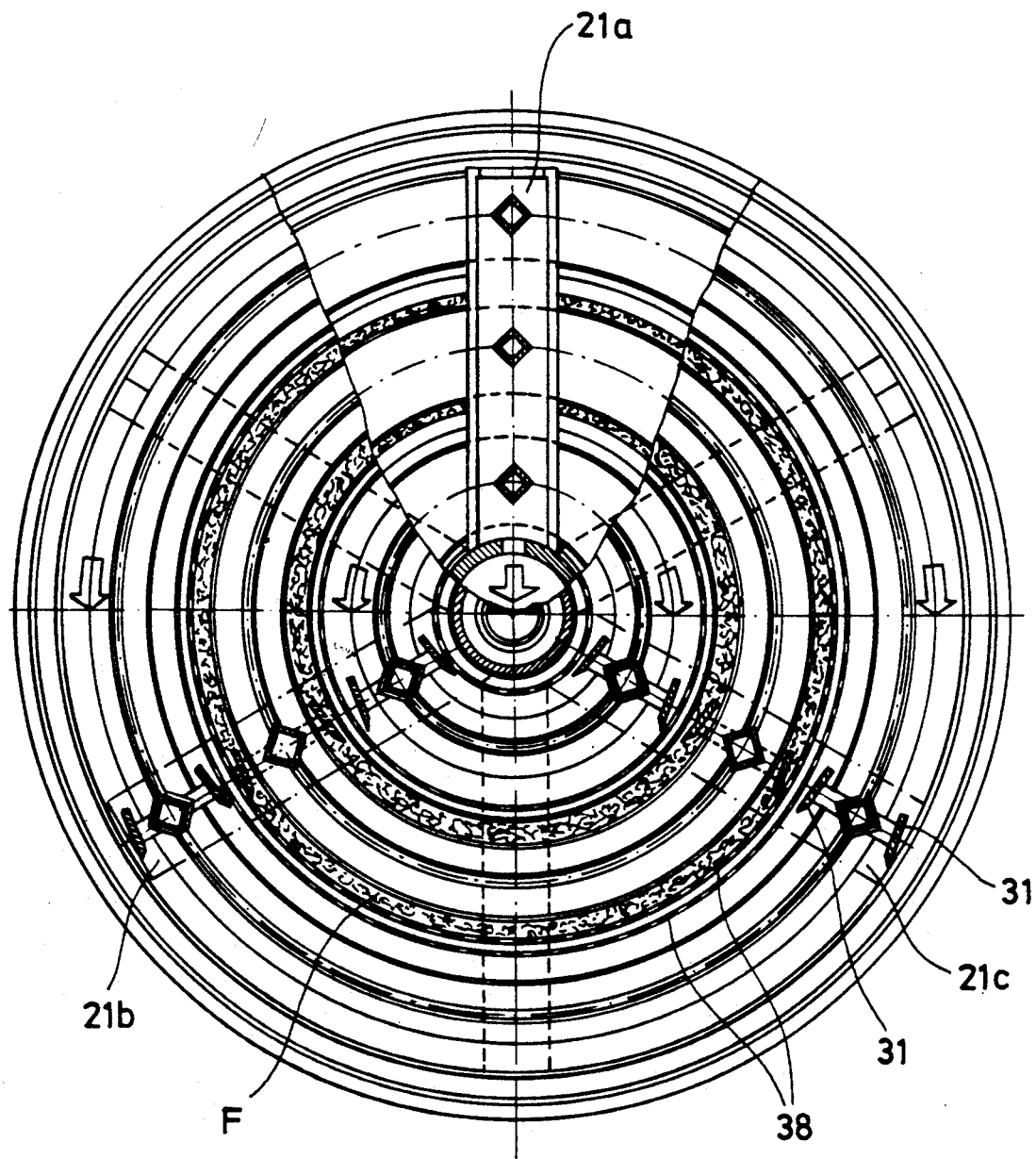
Figure 8:
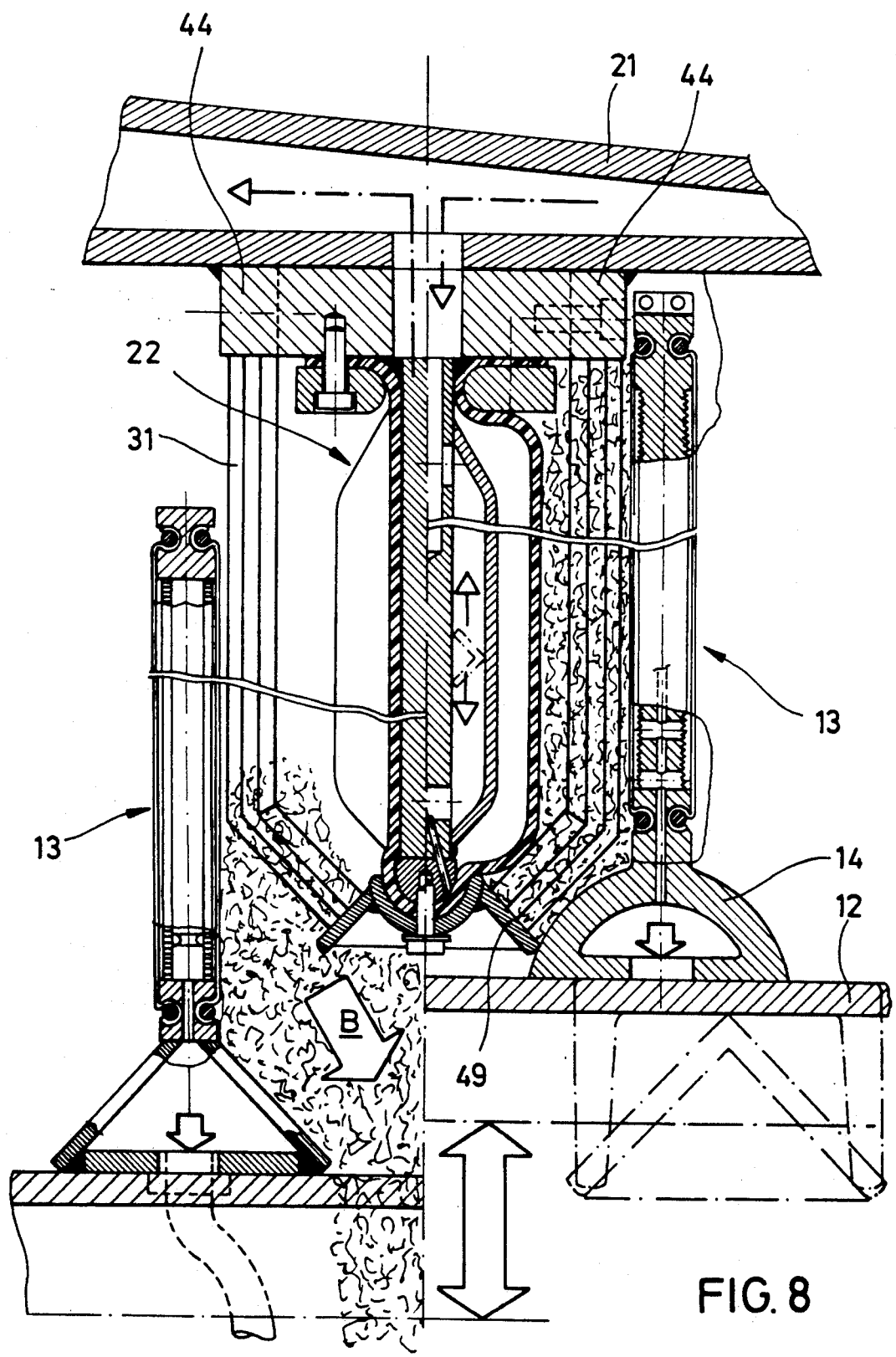
Figure 9:
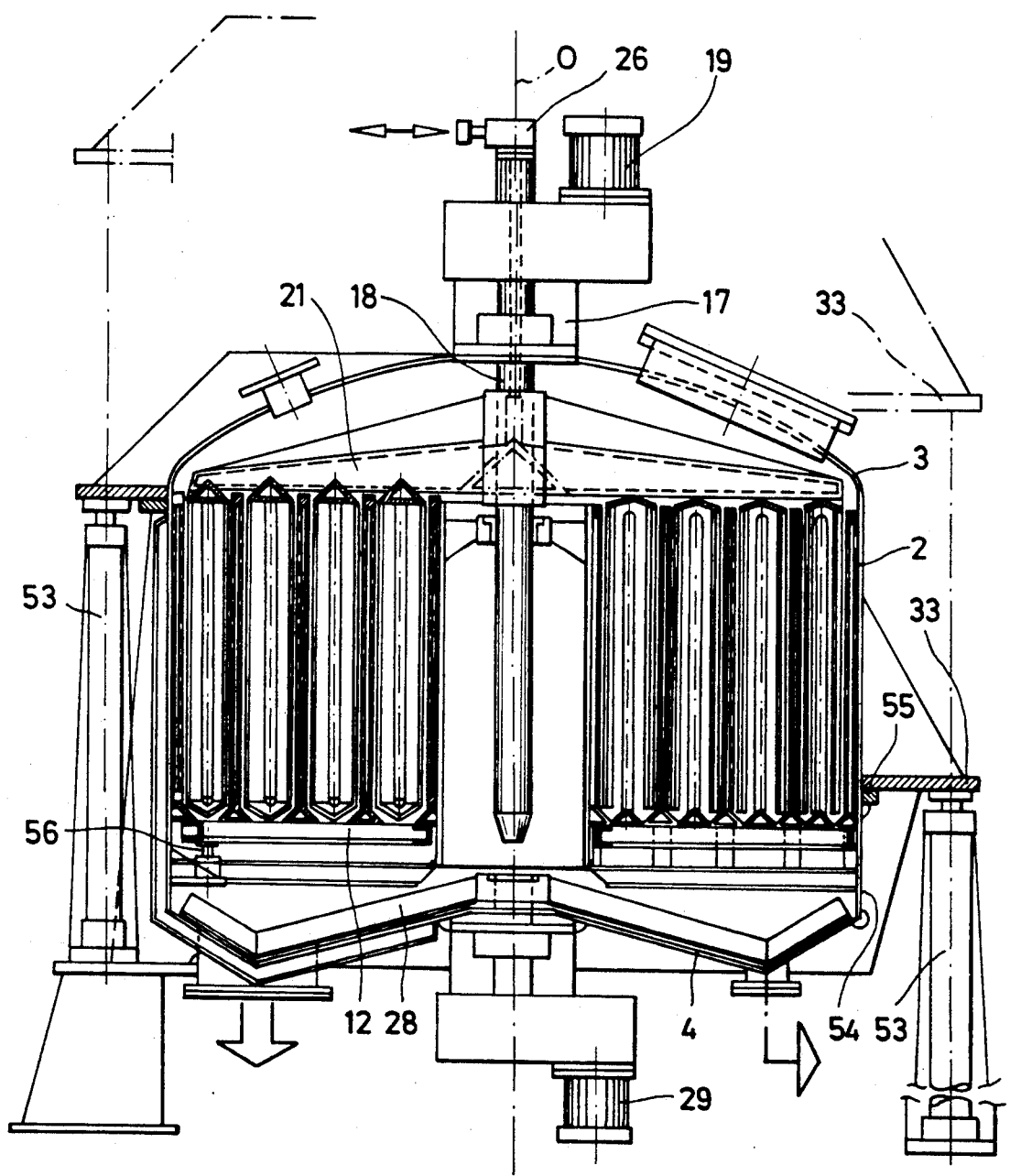
Figure 10:
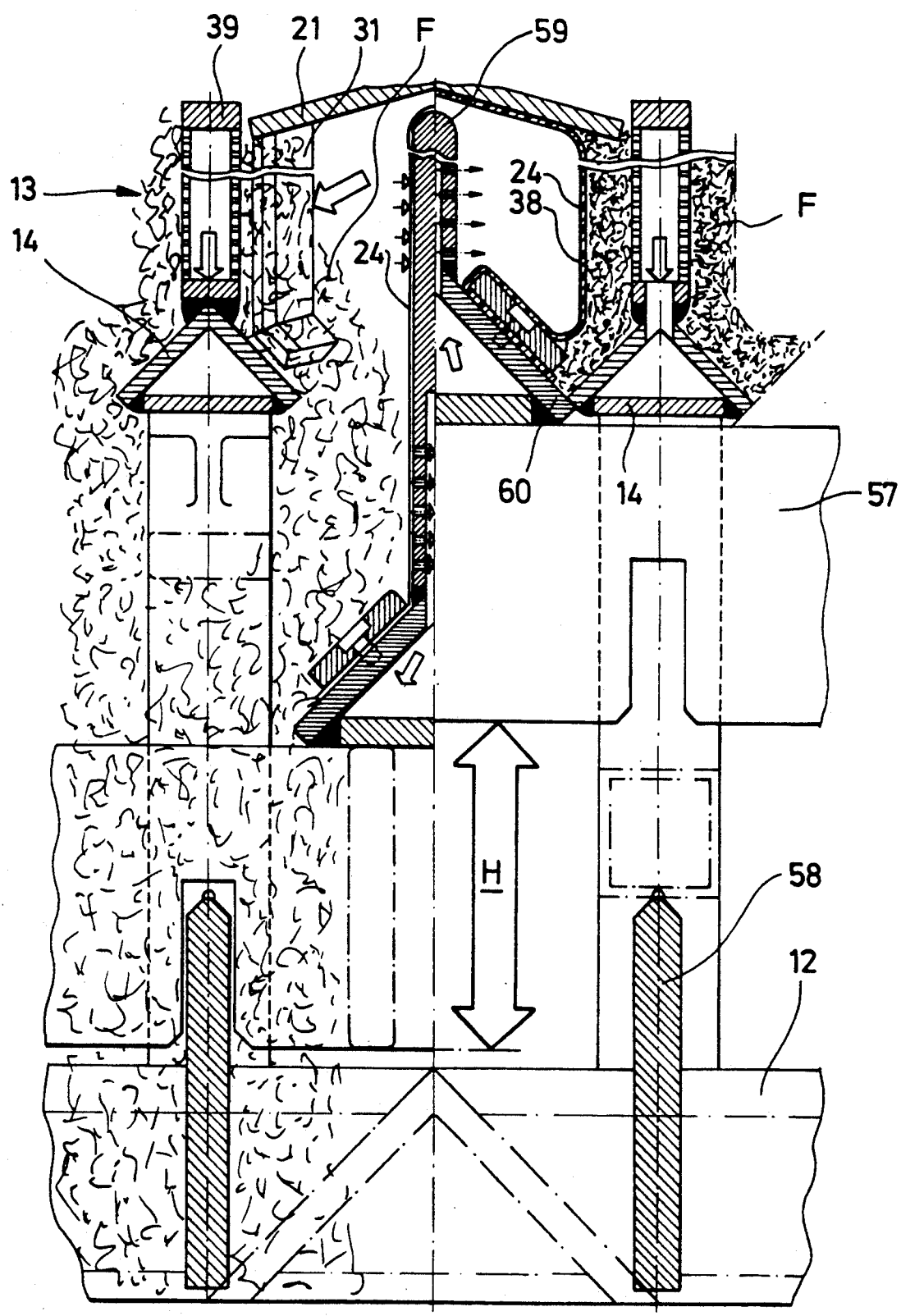

Further advantages and details of the invention shall now be explained with reference to embodiments of the invention shown by way of example in the accompanying drawings, wherein:

FIG. 1 shows a partially sectioned sideview of a first embodiment of the invention in two different variants, namely, on the left with a relatively deeply recessed lower bottom, and on the right with a relatively shallowly recessed lower bottom, FIG. 2 shows an enlarged illustration of a detail of FIG. 1 in two different operative positions, namely, on the left in the retracted position of the radial mounting structure, and on the right in the advanced position of the transverse mounting structure, at the same time depicting two different embodiments of filter element foot portions, FIG. 3 shows a radially sectioned view of segments of filter elements and a rotor element, taken along the line III—III in FIG. 4, FIG. 4 shows an alternative embodiment of a rotor element in two different operative positions, namely, on the left in the retracted position and on the right in the advanced position, the views being taken along the line IV—IV in FIG. 3, FIG. 5 shows a partially sectioned sideview of parts of a filter element, FIG. 6 shows an axially sectioned view similar to FIG. 1 of a filter press having rotatable filter elements, FIG. 7 shows a radially sectioned view of the filter press of FIG. 6, FIG. 8 shows a sectional view of parts of a filter press having a vertically movable carrier grid for filter elements carried thereon, FIG. 9 shows an axially sectioned overall view of a filter press having a vertically movable carrier grid, FIG. 10 shows a sectional view of parts of a simplified embodiment of the invention, in which inflatable pressurizing bodies disposed between the filter elements for the mechanical compression of filter cakes accumulated on the filter elements are mounted for vertical displacement without being rotatable.

Shown in FIG. 1 is a filter press according to the present invention, comprising a pressure vessel 1 of substantially cylindrical shape centered about a vertical axis 0. Pressure vessel 1 has a cylindrical sidewall 2 which may be of a double-walled construction permitting a temperature control medium, particularly a heating medium, to be passed therethrough. A medium of this type may be used for obtaining thermic effects for drying or evaporating the contents of the vessel.

Secured to cylindrical sidewall 2 by flanged connections at the upper and lower ends thereof are a top wall 3 and a bottom wall 4, respectively. Of these two, bottom end wall 4 may also be of double-walled construction for the introduction of a temperature control medium. Connections for the supply of such a temperature control medium are diagrammatically indicated at 5 in FIG. 1. Top end wall 3 is provided with several connecting sockets 6 giving access to the interior of vessel 1. These sockets may be used for supplying a sludge to the vessel or for introducing a washing liquid or a pressurizing gas thereinto. For this reason connecting sockets 6 are shown to be of different size.

Bottom end wall 4 is illustrated in two different embodiments in FIG. 1. In the left half of FIG. 1, bottom wall 4 is of a substantially funnel-shaped recessed configuration and provided adjacent its lowermost point with an outlet socket 7 having an outlet opening 8 adapted to be closed by a shut-off valve 9. Connected to shut-off valve 9 is a discharge pipe 10 extending to the inlet of a screw conveyor 11.

In the right half of FIG. 1 bottom wall 4 is of a relatively shallow configuration and provided with an outlet opening 8 with a discharge pipe 10 extending therefrom.

Disposed within pressure vessel 1 at a location below the bottom end of cylindrical sidewall 2 is a carrier grid 12 supported by the wall structure of the vessel to extend transversely thereacross. Carrier grid 12 carries a plurality of filter elements 13 formed as cylindrical wall elements secured to carrier grid 12 in concentric relation to one another and to the vessel's axis 0. In the example shown there are five such cylindrical wall filter elements 13. Their lower ends are provided with hollow annular foot portions 14 each communicating with a filtrate chamber formed within the respective filter element, and with the interior of at least one of the members of carrier grid 12, the respective members being of hollow construction. In this manner different filtrate chambers 37 may be communicated with different members of carrier grid 12 connected to different outlet sockets 15 and 16 at the outside of vessel 1.

Mounted on top end wall 3 is a bearing structure 17 carrying a hollow shaft 18 adapted to be rotated by an electric motor 17 mounted on bearing structure 17, and extending into the interior of vessel 1 through a sealing assembly 20 secured to top wall 3. Secured to shaft 18 at a location within vessel 1 above cylindrical sidewall 2 is a radial mounting structure 21 preferably comprising a plurality of radial mounting arms extending away from shaft 18 at equal angular spacings. The mounting arms carry rotary press elements 22 in the form of cylindrical wall elements each disposed between two adjacent filter elements 13. In the embodiment shown there are thus provided four such press elements 22.

Each press element 22 is composed of a carrier plate 23 formed as a cylindrical wall member, and two pressurizing diaphragms disposed on opposite sides thereof. The hollow interior sealed by said pressurizing diaphragm 24 communicates through a passage 25 with the interior of a mounting arm of mounting structure 21, the respective mounting arm being likewise of hollow construction. The interior of the hollow mounting arm communicates with the interior of hollow shaft 18, the latter being connected by way of a rotary sealing head 26 to a conduit 27 for the supply of a pressurizing medium, for instance compressed air, to the hollow interiors of pressurizing bellows 24.

In the example shown, hollow shaft 18 is axially displaceable relative to vessel 1, its lower position being shown by solid lines, and its raised position by dash-dotted lines. It is thus possible to axially displace press elements 22 relative to filter elements 13 within vessel 1. In the drawing the two radially outer press elements 22 are shown in their advanced or lowered position, whereas the two radially inner press elements 22 are illustrated in their retracted or raised position.

The portion of the vessel's interior defined between carrier grid 12 and bottom end wall 4 houses an agitator 28 adapted to be rotated by an actuating motor 29 secured to bottom end wall 4 by a flange connection at a central position. Agitator 28 comprises at least one agitator blade 30 extending closely adjacent the inner wall surface of bottom end wall 4. Agitator 28 is operable to generate, by acting from below, a fluid flow within pressure vessel 1 directed across the filter surfaces defined by filter elements 13 to thereby prevent premature clogging of the filter.

As also shown in FIG. 1, the two radially inner press elements are provided with scrapers 31 extending at a narrow spacing opposite the adjacent filter elements 13, and in the axial direction from radial mounting structure 21 to the lower ends of the press elements. As radial mounting structure 21 rotates about the axis of vessel 1, the scrapers prevent the filter cakes from adhering too strongly to filter elements 13, and are at a later stage operable, as will be explained, for removing the accumulated filter cakes from the filter elements. Vessel 1 further houses a central pipe 32 occupying the central space of vessel 1 whereat any substantial sludge flow cannot be generated. Central pipe 32 is secured to carrier grid 12 and may serve the additional purpose of guiding hollow shaft 18 and the shaft of agitator 28.

Cylindrical sidewall 2 of vessel 1 is preferably supported independently of top and bottom end walls 3 and 4 so as to permit the end walls to be readily dismounted. Shown on the left in FIG. 1 is a suitable pedestal 33 for supporting cylindrical sidewall 2.

FIG. 2 shows a sectional view on an enlarged scale of parts of the embodiment illustrated in FIG. 1. In particular, FIG. 2 depicts one of the hollow members of carrier grid 12 on which filter elements 13 are mounted. Each filter element 13 has a hollow foot portion 14 of annular shape, two possible embodiments of which are shown in FIG. 2. On the left in FIG. 2, foot portion 14 is of triangular sectional shape, while in the embodiment depicted on the right, the foot portion has a substantially semicircular cross-sectional shape. In both embodiments foot portion 14 is hollow and connected to a drain conduit 34 which may also be formed by the interior of a member of carrier grid 12 when the respective member is of a hollow construction. The hollow interior 35 of each foot portion 14 communicates through a passage 36 with the filtrate chamber 37 defined in the respective filter element 13 inwards of filter cloths 38. Each filter element 13 has a carrier body 39 in the shape of a cylindrical wall with inner and outer grooves 40 formed therein at both axial ends and acting as seats for resilient 0-rings 41 used for clamping the filter cloths 38 in place.

As will be explained later on, each filter element may be composed of a plurality of segments each formed as a section of a cylindrical wall and connected to one another in the circumferential direction.

Disposed between any two adjacent ones of the concentrically nested filter elements 13 is a rotary press element 22 secured to radial mounting structure 21. Each press element 22 comprises a carrier element 23 in the form of a cylindrical wall member provided on each side with at least one, and preferably a plurality of radially projecting ribs 42 extending in the axial direction. These ribs 42 are provided for creating a transverse fluid flow as the press element is being rotated. Each side, i.e. the radially inner side and the radially outer side of carrier element 23 is covered by a diaphragm 24 made of an elastically extensible material. At the side facing towards the radial mounting structure, diaphragm 24 is secured to a support ring 44 by means of a clamp ring 43, said rings forming the foot portion of the respective press element. At the axially opposite end each diaphragm is secured to a head portion 46 by means of an annular element 47 clampingly secured to head portion 46 by means of threaded bolts 48. Annular element 47 is provided with transversely projecting annular extensions 49 serving a purpose to be explained later on.

Secured to carrier ring 44 and annular extension 49 is at least one scraper 31, preferably, however, a plurality of scrapers 31 extending at a close spacing opposite the respective adjacent filter element 13.

As shown in FIG. 2, radial mounting structure 21 together with press element 22 secured thereto and the associated scaper 31 is axially displaceable between two end positions relative to carrier grid 12 and the filter elements 13 carried thereon, the length of the displacement stroke being indicated by the double arrow A in FIGS. 1 and 2. In the retracted or raised position, a gap is opened between annular extensions 49 and foot portions 14 of filter elements 13, so that filter cake can be discharged therethrough and through carrier grid 12 via openings 12' as indicated by arrow B in FIG. 2. In the advanced or lowered position shown on the right in FIG. 2, annular extensions 49 of the then stationary press elements are in contact with foot portions 14 of filter elements 13, and at the same time the radial end face of each carrier ring 44 extends in close proximity opposite the upper end of the adjacent filter element 13. The spaces between press element 22 and each of the adjacent filter elements 13 is thus substantially closed off by the respective carrier ring 44 and annular extension 49. In this state, which is shown on the right in FIG. 2, the hollow interior of each press element 22 enclosed between the associated diaphragms 24 may be supplied with a pressurizing medium through a radial arm of radial mounting structure 21 as indicated by arrow C in FIG. 2, as a result of which diaphragms 24 are expanded towards the adjacent filter elements 13 for compressing and squeezing the filter cakes accumulated thereon, as indicated on the right of FIG. 2 by arrows D. The sealing of the sludge space by carrier ring 44 and annular extension 49 prevents the filter cake F from escaping. In this manner the filter cake is mechanically compressed and squeezed out. Since the compression pads formed by diaphragms 24 are provided on both sides of each filter element 13, the arrangement as a whole is mechanically stable. In addition, carrier rings 44 and annular extensions 49 in cooperation with foot portions 14 of filter elements 13 are effective to support diaphragms 24 in their expanded state so as to protect them from damage.

FIG. 3 shows a sectional view of the assembly of FIG. 2 taken along the line III—III in FIG. 4. In the upper portion of FIG. 3 compression diaphragm 24 is expanded into compressive contact with filter cake F by the supply of a pressurizing medium as indicated by arrows D, while in the lower portion of this figure, diaphragm 24 is attracted into contact with carrier body 23 in the direction of arrows E by the evacuation of the hollow space inside of diaphragm 24, causing the latter to wrap itself about rib(s) 42. In this state scraper 31 may be moved in the direction of arrow G for detaching filter cake F from filter cloth 38. It is of course obvious that the two states of compression diaphragms 24 depicted in FIG. 3 cannot prevail at the same time. In the drawing the two states of the diaphragm are merely depicted by way of example for illustrating the different operative conditions.

Also shown in FIG. 3 is the manner in which the filter elements may be composed of a number of segments forming a closed circle in the assembled state. To this purpose, and as shown in the upper portion of FIG. 3, the circumferential ends of adjacent filter element segments are provided with web portions 50 used for securing them to one another.

While FIGS. 1 and 2 showed an embodiment of the invention, in which radial mounting structure 21 together with the rotary press elements secured thereto is displaceable relative to filter elements 13 by axial displacement of rotor shaft 18, FIG. 4 illustrates an embodiment in which the radial mounting structure is mounted at an axially fixed position and the press elements are telescopically extensible for bringing annular extensions 49 into contact with foot portions 14 of the filter elements. To this purpose the annular head portion of each press element 22 is guided on a plurality of guide rods or on a cylinder 51 having an associated axial bore 52 formed in carrier body 23 of press element 22. The supply of a pressurizing fluid (arrow C) to the space defined between diaphragms 24 causes annular head portion 46 with annular extension 49 to be advanced from the retracted position shown on the left of FIG. 4 to the advanced position illustrated on the right, in which annular extension 49 is engaged with foot portion 14.

In this example the scraper is composed of an upper scraper section 31a secured to radial mounting structure 21 and a lower scraper, section 31b secured to annular extension 49 of press element foot portion 46 and guided on upper scraper section 31a for displacement in the axial direction. The remaining elements shown in FIG. 4 correspond to those of FIG. 2, so that any further detailed explanation can be dispensed with.

FIG. 5 shows a sideview of parts of two filter element segments 13 connected to one another in the circumferential direction by means of threaded bolts. Also shown in this figure is the mounting of filter cloths 38 on carrier bodies 39 of filter elements 13 by means of O-rings 41 received in grooves.

It should be mentioned that the distance between radial mounting structure 21 and top end wall 3 of vessel 1 may be selected to be as great as to permit press elements 22 to be retracted more or less completely from between filter elements 13 in the axial direction. This is for the following reason: When at the end of a filtering cycle the filter cakes accumulated on filter elements 13 are mechanically compressed and squeezed out with the aid of diaphragms 24, it is possible that scrapers 31, as shown in the upper portion of FIG. 3, are solidly embedded in the compacted filter cakes F, as a result of which an excessive torque would be required on rotor shaft 18 for starting operation of the rotor. This may lead to damage or failure of the filter press as a whole. In this case it is much easier, however, to extract scapers 31 from filter cakes F in the axial direction. To achieve this end, the rotor, i.e. rotor shaft 18 together with the elements attached thereto, is displaced upwards in the axial direction, so that radial mounting structure 21 is raised into the free space between the upper ends of filter elements 13 and top end wall 3, as a result of which scrapers 31 are extracted from filter cakes F in the axial direction. Subsequently the rotor is again started to rotate and at the same time gradually lowered, thus enabling scrapers 31 to progressively strip filter cakes F off filter elements 13 without the danger of the torque acting on rotor shaft 18 becoming excessive.

FIG. 6 shows a general view in axial section of a filter press having three filter elements and three rotor elements extending downwards between filter elements 13 or between outermost filter element 13 and cylindrical sidewall 2 of vessel 1, respectively. In the filter press of this example press elements 22 are of the construction shown in FIG. 4, two of the press elements, namely, the innermost and the outermost ones, being depicted in the retracted state, while the intermediate press element 22 is shown in the extended state.

This embodiment of the invention differs from the previously described one by the provision that carrier grid 12 is secured to a shaft 61 extending into vessel 1 through bottom end wall 4 and rotatably and sealingly mounted therein. At least the lower portion of shaft 61 is of hollow construction, at least one member 62 of carrier grid 12 being likewise of hollow construction, so that its hollow interior establishes communication between the filtrate chambers 37 of the filter elements 13 mounted on carrier grid 12 and the hollow portion of shaft 61.

Shaft 61 is connected to a separate actuating motor (not shown) and thus adapted to be rotated independently of rotor shaft 18. At the same time it serves as a drain for the filtrate obtained in filtrate chambers 37.

In this filter press, the rotary press element with its ribs, scrapers and compression diaphragms on the one hand and filter elements 13 on the other can be rotated in opposite directions, so that the generation of a transverse flow of the sludge relative to filter elements 13 at a desired rate requires the two shafts to be rotated at only half the speed as in the case of the previously described embodiments.

In this filter press central support pipe 32 is fixedly connected to second shaft 61 as a substantially integral part thereof, and may be provided with internal guide structures 63 as shown in FIG. 6 for concentrically guiding rotor shaft 18 extending telescopically therethrough. Below carrier grid 12 second shaft 61 may carry an agitator 28 secured thereto, comparable to agitator 28 of FIG. 1, permitting the filter cake stripped off filter elements 13 by scrapers 31 to be discharged from the vessel through a discharge opening formed in bottom end wall 4.

Shaft 61 may also be mounted in bottom end wall 4 for axial displacement relative thereto, to thereby achieve the same effects as with the already described displaceable mounting of the rotor shaft, or to enhance these effects.

FIG. 7 shows a radially sectioned view of the filter press of FIG. 6. The radial mounting structure shown in this figure comprises three radial mounting arms 21a, 21b, 21c carrying respective scrapers 31 secured thereto, so that three scrapers are associated to each filter cloth 38 and to circumferential wall 2 of vessel 1, respectively. Also indicated in FIG. 7 by phantom lines are three members of a carrier grid supporting the filter elements of which only filter cloths 38 are depicted in FIG. 7.

FIG. 8 illustrates an alternative embodiment of the invention, in which the relative displacement of the lower ends or head portions of press elements 22 is accomplished not by moving the latter, but rather by axial displacement of carrier grid 12 with filter elements 13 carried thereon. On the left in FIG. 8 the assembly is shown in the retracted or lowered state of carrier grid 12, in which a passage is opened for the discharge of the filter cakes in the direction of arrow B, while on the right of FIG. 8 the carrier grid 12 with the filter elements mounted thereon is shown in the advanced or raised state in which the passage between annular extension 49 of press element 22 and foot portion 14 of the associated filter element 13 is closed, while at the same time carrier ring 44 is disposed closely opposite the upper end of filter element 13 to thereby substantially close the sludge space in a manner comparable to the state shown on the right of FIG. 2. For a further explanation of the functions obtainable by the relative positions of the components in the different states, reference should be made to the description of FIG. 2.

FIG. 9 shows an embodiment of the invention in which the cylindrical sidewall 2 of vessel 1 can be lifted off a bottom assembly 54 of the vessel by means of hydraulic jacks 53, together with top end wall 3, bearing structure 17 and electric motor 19 mounted thereon and rotor shaft 18 including radial mounting structure 21 secured thereto, the upper portion of vessel 1 composed of cylindrical sidewall 2 and top end wall 3 being releasably secured to bottom assembly 54 by a quick-release flange connection. The raised position is indicated by dash-dot lines in FIG. 9. In this embodiment the filter elements and rotor elements are readily accessible. As also shown in FIG. 9, carrier grid 12 with the filter elements mounted thereon is supported on bottom assembly 54 by means of hydraulic jacks 56 permitting it to be raised and lowered.

In this embodiment of the invention bottom end wall 4 is of substantially W-shaped cross-sectional configuration, and may be of a double-walled construction similar to that of cylindrical sidewall 2 as shown on the left in FIG. 9. Disposed in the bottom space of vessel 1 is an agitator 28 operable to generate a transverse flow of the sludge within the vessel.

It is obvious that foot portions 14 of filter elements 13 should be connected to carrier grid 12 in a readily releasable manner for thus facilitating replacement of the filter elements. When the filter elements are composed of individual segments each formed as a circular arc when viewed from the top, the inner faces of such segments are likewise readily accessible for replacement of the filter cloths.

FIG. 10 illustrates an embodiment of the invention in which the only rotor elements are scrapers 31 secured to radial mounting structure 21. Disposed between adjacent filter elements 13 mounted on carrier grid 12 are press elements formed as cylindrical walls and mounted on a non-roatable carrier frame 57 itself mounted for axial displacement on carrier grid 12 by means of guide members 58. The righthand half of FIG. 10 shows carrier frame 57 with press elements 59 mounted thereon in the raised position in which a head portion 60 provided on each press element is in contact from below with the foot portion 14 of the adjacent filter element 13 so as to close the bottom end of the sludge space. The lefthand half of FIG. 10 shows carrier frame 57 in its lowered position in which it permits filter cake F to be stripped off the adjacent filter element 13 by scraper 31 and to drop out through the passage opened between head portion 14 of filter element 13 and foot portion 60 of press element 59. Both sides of press element 59 are lined with a press diaphragm 24 depicted on the left in FIG. 10 in its collapsed state on press element 59, and on the right in its fluid-pressurized state for the compression of filter cake F. The raising and lowering of carrier frame 57 by a stroke indicated by the double arrow H in FIG. 10 may be accomplished by means of hydraulic actuators. It is of course obvious that suitable flexible connections have to be provided for the supply of a pressurizing medium to the hollow spaces of the press elements enclosed by press diaphragms 24.

It should finally be mentioned that the end walls 3 and 4 of the vessel are suitably of a domed configuration for obtaining maximum strength of the vessel with a minimum wall thickness. This is because the filter press is preferably operated under increased hydraulic pressure of the sludge, as is the common practice in conventional filter presses, to thereby accelerate the filtering operation.

I claim:

1. A filter press comprising:

- a substantially cylindrical vessel having an upright axis and having at least one inlet and at least one outlet;
- a plurality of filter elements disposed in said vessel being formed as cylindrical, double-walled tubes, having a perforate surface structure and defining each an annular filtrate chamber communicating with at least one filtrate outlet, said filter elements having upper and lower ends and having different diameters and being disposed concentrically about said vessel axis, one within the other leaving annular spaces between each two of said filter elements, and being supported within said vessel by foot portions formed at their lower ends on a carrier grid extending within said vessel transversely to the axis thereof, the filtrate outlets extending through said foot portions and through said carrier grid, each portion of said carrier grid adjacent a respective said annular space having a filter cake outlet opening extending there-through, said filter elements having head portions at their upper ends;
- a first hollow rotor shaft defining a channel for the supply and discharge of a pressurized fluid and rotatably mounted in said vessel and extending in the vessel axis and being connected to a drive source, said rotor shaft carrying a mounting structure fixedly attached thereto and extending therefrom transversely to the vessel axis and opposite the head portions of said filter elements;
- tubular press elements of different diameters and having upper and lower ends being affixed by foot portions at their upper ends to said mounting structure concentrically with respect to said vessel axis and extending each one in one of said annular spaces defined between said filter elements so as to leave annular spaces on both sides of a press element between same and the opposite filter elements, the press elements being provided at their lower ends with head portions close to the foot portions of said filter elements, said press elements being composed each of a rigid tubular carrier body and two elastically expansible press diaphragms covering both sides of said carrier body and secured thereto at foot and head portions thereof, said diaphragms enclosing a sealed hollow space communicated by a conduit to said channel in said first hollow rotor shaft for the supply and discharge of a pressurized fluid supplied by a pressurized fluid source connected to said channel within said rotor shaft into said hollow space to inflate same and thereby move the diaphragms radially towards the respective adjacent filter elements and to withdraw said fluid from said hollow space to deflate same, respectively; and,
- wherein means are provided for reducing and increasing the distance between said head portions of the press elements and said foot portions of the filter elements by relative axial movement with respect to each other of at least said head portions of the press elements and the filter elements between an advanced position in which said head portions of the press elements are in contact with said foot portions of the filter elements, to cover said filter cake outlet openings, and a retracted position in which a distance exists between said head portion of the press elements and said foot portions of the filter elements, to uncover said filter element cake outlet openings.

2. A filter press according to claim 1, wherein means are provided for moving at least the head portions of said press elements in an axial direction of said vessel between the advanced position in which said head portions of the press elements are in contact with said foot portions of the filter elements, and the retracted position, respectively.

3. A filter press according to claim 2, wherein means are provided for moving said first hollow rotor shaft together with said mounting structure attached thereto and said press elements supported thereon in axial direction so as to bring said head portions of said press elements into said advanced and retracted positions, respectively.

4. A filter press according to claim 2, wherein the carrier body of each press element is composed of a tubular section secured to said mounting structure and each said head portion comprises a displaceable annular head portion guided on a free end of said tubular section so as to be displaceable in the axial direction of said vessel and having a respective end of each of the associated press diaphragms sealingly secured thereto.

5. A filter press according to claim 2 wherein said carrier grid with said filter elements supported thereon is mounted in said vessel displaceably in the axial direction of said vessel between a retracted position in which a distance is existent between the head portions of said press elements and said foot portions of the filter elements, and an advanced position in which said foot portions of the filter elements are in engagement with the head portions of said press elements.

6. A filter press according to any one of the preceding claims, wherein the foot portion of each press element is provided with two support rings disposed on the inner and outer sides of the tubular carrier body, respectively, said support rings being affixed to the mounting structure, said support rings having one of the ends of the diaphragms of the respective press element sealingly secured thereto.

7. A filter press according to any one of claims 2 to 5, wherein the head portion of each press element is provided with annular extensions projecting radially from said head portion and adapted to contact the foot portions of the adjacent filter elements in said advanced position of said press element head portions of said carrier grid, respectively.

8. A filter press according to claim 7, wherein each of said press diaphragms has one of its ends clamped between the head portion and an associated annular extension of the carrier body of the respective press element.

9. A filter press as set forth in any one of claims 1 to 5, wherein the carrier body of each press element is provided on the inner one of its surfaces with at least one radially inwardly projecting rib and on the outer one of its surfaces with at least one radially outwardly projecting rib, said ribs extending substantially in the axial direction of said vessel and being covered by the respective diaphragms.

10. A filter press as set forth in any one of claims 1 to 5, wherein said carrier grid comprises at least one tubular member, the interior of which communicates with the filtrate chambers of said filter elements.

11. A filter press as set forth in any one of claims 1 to 5, wherein said mounting structure extending from said first hollow rotor shaft comprises at least one tubular member, in the interior of which is in fluid-transmitting communication with the hollow spaces enclosed by said diaphragms and with the channel within said rotor shaft.

12. A filter press according to any one of claims 1 to 5, wherein an agitator is disposed within the vessel in a space located on a side of said carrier grid facing away from said filter elements, said agitator being provided with a drive source independent of the drive source of said hollow rotor shaft.

13. A filter press according to any one of claims 1 to 5, wherein the vessel has a bottom end wall located adjacent a side of said carrier grid and facing away from said filter elements which is substantially shaped as the letter "W" in axial section.

14. A filter press according to any one of claims 1 to 5, wherein said carrier grid is secured to a second rotor shaft rotatably mounted in said vessel and being at least in part hollow, said carrier grid comprising at least one tubular member the interior of which communicates with the filtrate chambers of the filter elements mounted thereon and with the interior of the hollow section of said second rotor shaft, said second rotor shaft being connected to a drive source independent of the drive source of the first hollow rotor shaft.

15. A filter press according to claim 14, wherein said vessel includes a top end wall adjacent said mounting structure and a bottom end wall adjacent a side of said carrier grid facing away from said filter elements, wherein said first and second rotor shafts extend through said top and bottom end walls of said vessel, respectively, said bottom end wall being formed with a closable discharge opening, said second rotor shaft carrying an agitator secured thereto on a side of said carrier grid facing away from said filter elements and extending in close proximity to said bottom end wall.

16. A filter press according to claim 14, wherein said second rotor shaft is mounted in said bottom end wall for axial displacement with respect to said bottom end wall.

17. A filter press according to claim 15, wherein said vessel includes a top end wall adjacent said mounting structure and a bottom end wall adjacent a side of said carrier grid facing away from said filter elements, wherein said first and second rotor shafts extend through said top and bottom end walls of said vessel, respectively, said bottom end wall being formed with a closable discharge opening, said second rotor shaft carrying an agitator secured thereto on a side of said carrier grid facing away from said filter elements and extending in close proximity to said bottom end wall.

18. A filter press according to claim 17, wherein said first and second rotor shafts are concentrically guided partly one within the other, the radially outer one of said rotor shafts being provided with internal guide elements.

19. A filter press according to claim 14, wherein said first and second rotor shafts are concentrically guided partly one within the other, the radially outer one of said rotor shafts being provided with internal guide elements.

20. A filter press according to claim 16, wherein said first and second rotor shafts are concentrically guided partly one within the other, the radially outer one of said rotor shafts being provided with internal guide elements.

21. A filter press according to any of claims 1 to 5, wherein said carrier grid includes a plurality of drain conduits, the filtrate outlets of respective filter elements communicating with different ones of said drain conduits acting as separate filtrate drain passages.

22. A filter press according to any one of claims 1 to 5, wherein between each press element and the adjacent filter elements at least one scraper element is disposed extending in the axial direction in close radial proximity to the respective filter element and secured to the mounting structure and to the head portion of the respective press element.

23. A filter press according to claim 22, wherein each one of said scraper elements is composed of a section secured to said mounting structure and a section secured to the head portion of the associated press element, the two sections being guided for displacement relative to one another in the longitudinal direction of said scraper elements.

24. A filter press according to any one of claims 1 to 5, wherein said filter elements each comprise a filter material secured to both sides of each filter element by means of resilient clamping elements received in grooves formed in the filter element.

25. A filter press according to any one of claims 1 to 5, wherein said mounting structure is composed of a plurality of radial arms secured to said first hollow rotor shaft at regular angular spacings.

26. A filter press according to any one of claims 1 to 5, wherein the foot portions of the filter elements each are a hollow annular member secured to said carrier grid.

* * * * *

UNITED STATES PATENT AND TRADEMARK OFFICE
CERTIFICATE OF CORRECTION

PATENT NO. : 5,154,825
DATED : October 13, 1992
INVENTOR(S) : Dieter Kupka

It is certified that error appears in the above-identified patent and that said Letters Patent is hereby corrected as shown below:

Column 4, line 38:

"of pressurizing bellows 24." should read:

--sealed by diaphragms 24.--.

Column 7, line 13:

"scraper, section 31b" should read:

--scraper section 31b--.

Column 8, line 23:

Sentence beginning "Below carrier grid" should begin a new paragraph.

UNITED STATES PATENT AND TRADEMARK OFFICE
CERTIFICATE OF CORRECTION

PATENT NO.   : 5,154,825
DATED        : October 13, 1992
INVENTOR(S)  : Dieter Kupka It is certified that error appears in the above-identified patent and that said Letters Patent is hereby corrected as shown below:

Column 11, Claim 11, line 67:

"member, in the interior of which" should read:

--member, the interior of which--.

Signed and Sealed this

Twenty-first Day of September, 1993

Attest:

BRUCE LEHMAN

Attesting Officer

Commissioner of Patents and Trademarks